UNITED STATES PATENT OFFICE 2,276,478

FLEXIBLE LAMINATED FILM

Donald L. Gibb and William R. Collings, Midland, Mich., assignors to The Dow Chemical Company, Midland, Mich., a corporation of Michigan No Drawing. Application November 20, 1937, Serial No. 175,702

2 Claims. (Cl. 154—43)

This invention relates to flexible films of cellulose derivatives to which is firmly bonded a film of polystyrene, or a polymerized homologue or analogue of styrene, or co-polymers of these materials with other polymerizable materials.

In the preparation of thin sheets, films, or foils from polystyrene alone, it is difficult to overcome the inherent brittleness of the polystyrene. When plasticizers are added to the polystyrene, the resulting composition is ordinarily too soft to be of commercial value as a wrapping material. In order to contribute sufficient flexibility to polystyrene so that sheets or films thereof might be employed as wrapping materials, it has been found necessary to incorporate therewith from 25 to 50 per cent of a plasticizer, based on the weight of polystyrene employed. When the proper degree of flexibility has been produced by plasticizers, the sheet is still unsuited as a wrapping foil, as it is ordinarily too tacky for this purpose. The introduction of plasticizers into the composition tends to lower the dielectric strength and breakdown potential of the polystyrene product so that sheets, foils, or tape prepared therefrom are not particularly satisfactory for use as electrical insulating means.

Films produced from cellulose ethers, such as ethyl cellulose or benzyl cellulose, or from cellulose esters, such as cellulose acetate or cellulose butyrate, are capable of considerably greater elongation and have a greater natural flexibility than do films of corresponding thickness prepared from polystyrene or from its analogues, homologues, or copolymers. Such cellulose derivative films have fair electrical properties which are not, however, as generally desirable as those of the polystyrene products. The cellulose derivative films have a rather high moisture permeability as compared with similar thicknesses of polystyrene. It has been found difficult to moisture-proof an ethyl cellulose film, for example, and still obtain a transparent foil suitable for wrapping purposes and the like.

Previous attempts to take advantage of the most desirable properties of organic derivatives of cellulose and of polystyrene by casting films containing both of these materials have met with indifferent success due to the inherent incompatability of the two types of materials. We have now found that clear, transparent films having a flexibility greatly exceeding that of styrene alone, and approaching that of ethyl cellulose alone, having a moisture resistance equal to that of styrene alone, and having insulating properties equal to those of either styrene or ethyl cellulose alone, may be made successfully by forming an integrally bonded, laminated film containing one or more layers of polystyrene and one or more layers of ethyl cellulose. A simple film would consist of a single layer of ethyl cellulose, one surface of which is bonded to a single layer of polystyrene. For some purposes, however, it is desirable to prepare a film having multiple laminations with successive layers of ethyl cellulose and polystyrene, wherein either the ethyl cellulose or the polystyrene may constitute the outer or exposed layer.

We have found that when laminating styrene and ethyl cellulose to form a bonded multiple-layer film, it is necessary only to cast a film of ethyl cellulose from any of its usual solvents (especially those which are also solvents for polystyrene), and, after completely evaporating the solvent therefrom, to cast thereover a film from a solution of polystyrene dissolved in an aromatic hydrocarbon. After the aromatic hydrocarbon has evaporated a laminated film is obtained, the two layers of which are intimately bonded, one to the other. Such a film is characterized by the usual flexibility, tensile strength, and elongation characteristics possessed by ethyl cellulose and has the inherent moisture-proof qualities of polystyrene. The dielectric properties of such materials are equal to those of polystyrene itself and are greatly superior to a polystyrene-plasticizer composition of similar flexibility.

If desired, the styrene film may be deposited first, and a cellulose derivative film deposited thereover from solution in a solvent for such cellulose derivative which does not comprise any non-solvent for the polystyrene.

In another method of preparing the new product, plasticized films of polystyrene and of a cellulose derivative may be separately prepared, employing a plasticizer which is compatible with both types of film-forming material, and bonding the said films by pressing them together between rollers heated to a temperature sufficiently high to cause the plasticizer to act as a common solvent for the two layers at the contact surface. In general, however, the process first above described gives the most satisfactory product, from the standpoint of permanence of the bond, flexibility and impermeability of the foil, and dielectric properties.

The following examples illustrate the practice of our invention:

*Example 1*

An ethyl cellulose sample of a grade considered satisfactory for most film-casting operations was dissolved to form a 15 to 20 per cent solution in a solvent consisting of 85 parts of xylene and 15 parts of butyl acetate by volume. A film of polystyrene was cast from a solution thereof in xylene, and the xylene evaporated therefrom. The ethyl cellulose-containing solution was spread over the so-formed styrene film, and when the cellulose ether solvent had evaporated a transparent laminated product was obtained, the two layers of which could not be separated by flexing, stretching, or tearing. The physical properties of the film were those ordinarily desired for wrapping material, and the dielectric properties thereof rendered the material satisfactory for electrical insulation.

Example 2

A product similar to that obtained in the previous example was prepared by first depositing a film of ethyl cellulose on a plane surface, evaporating the solvent therefrom, spreading thereover a layer of a concentrated solution of polystyrene in xylene, and evaporating the xylene.

Example 3

A multi-layer product of ethyl cellulose and polystyrene was prepared by casting a film of polystyrene from an aromatic hydrocarbon solution thereof, evaporating the solvent, depositing theeron a film of ethyl cellulose from a concentrated solution in a solvent consisting of 90 per cent xylene and 10 per cent butyl acetate by volume, and, after this solvent had evaporated, depositing on the exposed ethyl cellulose layer a further film of polystyrene.

When a non-solvent for polystyrene or a solvent containing materials which do not in themselves dissolve polystyrene to any appreciable extent is employed in depositing an ethyl cellulose film on a polystyrene film, the bond between the two layers will be found to be very weak. For this reason solvents are employed which contain no alcohol or other polystyrene non-solvent.

If desired, one or more of the components of the laminated structure may contain plasticizers, coloring agents, or pigments. When plasticizers are employed, these should preferably be of a type which will not detract from the moisture proofness of the laminated product and should preferably be materials characterized by good dielectric properties so that the final product will possess all of the desirable physical and electrical properties of each of the components thereof.

The invention has been illustrated with reference to laminated films, foil, tape, and the like prepared from ethyl cellulose and polystyrene. It is equally applicable to the preparation of similar laminated products from other cellulose derivatives. For example, benzyl cellulose, benzyl ethyl cellulose, cellulose acetate, cellulose butyrate, or mixed esters such as cellulose acetate-butyrate may be employed, care being exercised to select as the cellulose derivative one having the proper proportion of substituent groups per glucose unit to provide maximum transparency, flexibility, tensile strength, etc. It is also essential that the cellulose derivative employed be one which will dissolve readily to form concentrated solutions in materials capable of dissolving polystyrene without requiring the aid of alcohols or other materials which are either non-solvents for polystyrene or which dissolve it only with difficulty.

Polystyrene itself is not the only polymeric styrene-type compound which may be employed in the preparation of laminated films of the type herein described. For example, polymeric divinyl benzene, ethyl vinyl benzene, propenyl or iso-propenyl benzene are all memberse of the styrene family and may be similarly employed. In an analogous manner, co-polymers of styrene, more particularly those which are readily soluble in organic solvents capable of dissolving the aforementioned cellulose derivatives, may be employed as readily as polystyrene itself, and are considered to be more desirable from many standpoints than are polystyrene films to which plasticizers have been added mechanically because such co-polymers are internally or molecularly plasticized. Among such co-polymers may be mentioned styrene-vinyl acetate, styrene-methyl acrylate, styrene-methyl methacrylate, and similar co-polymers prepared from styrene and other polymerizable materials.

The solvents which may be satisfactorily employed for the herein-described process include such aromatic hydrocarbons as benzene, toluene, and xylene; the aliphatic acid esters of lower monohydric alcohols such as the ethyl, propyl, butyl, and amyl acetates, ethyl butyrate, etc.; and mixtures of the foregoing such as xylene-butyl acetate, benzene-ethyl acetate, and the like.

Other modes of applying the principle of our invention may be employed instead of the one explained, change being made as regards the steps disclosed and the materials used, provided those stated by any of the following claims or their equivalent be employed.

We therefore particularly point out and distinctly claim as our invention:

1. As a unitary flexible article of manufacture, a film consisting of at least one lamina consisting of ethyl cellulose and at least one lamina consisting of polystyrene, successive laminae consisting alternately of the ethyl cellulose and of the polystyrene.

2. As a unitary flexible article of manufacture, a film consisting of one lamina consisting of ethyl cellulose and one lamina consisting of polystyrene.

DONALD L. GIBB.
WILLIAM R. COLLINGS.